2 Sheets—Sheet 1.
M. JOHNSON.
Cultivator.
No. 203,048. Patented April 30, 1878.
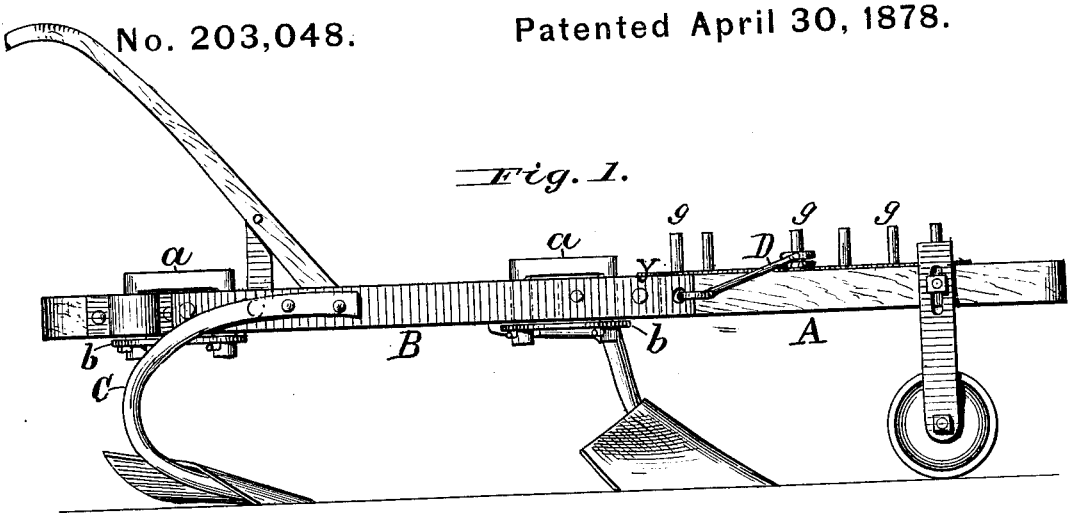
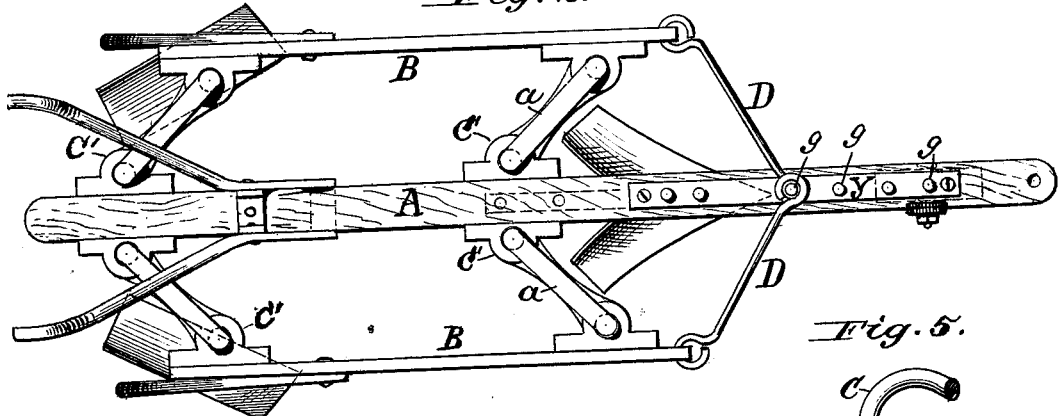
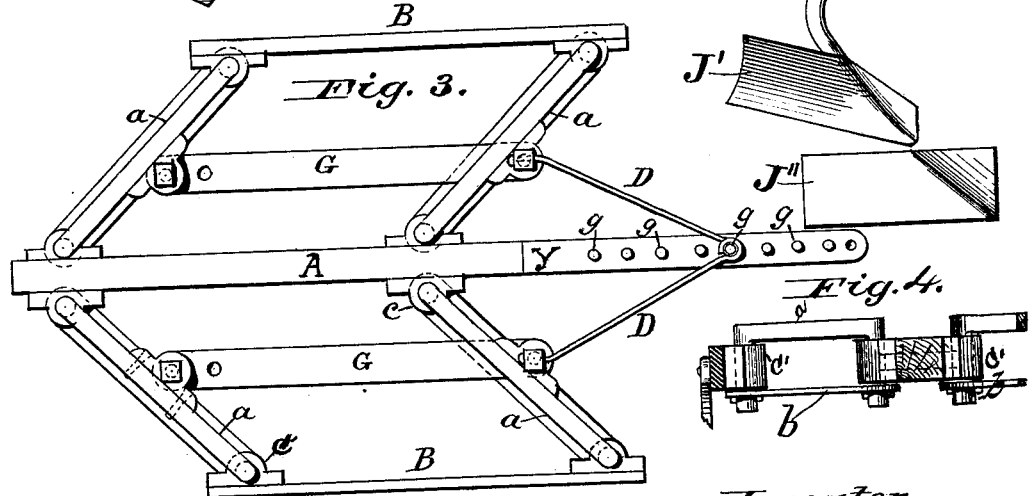
Attest:
H. L. Perrine
H. A. Daniels
Inventor
Moses Johnson
By Myers & Co.
Att'y's

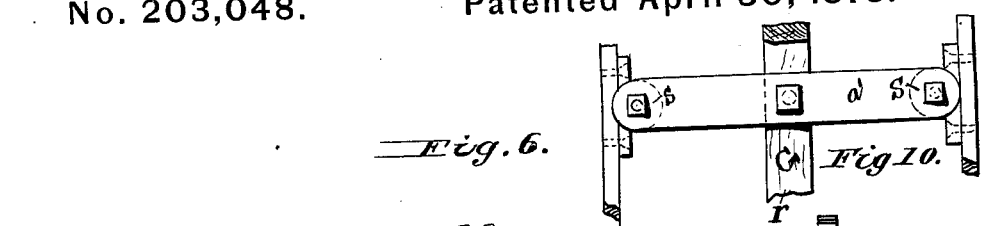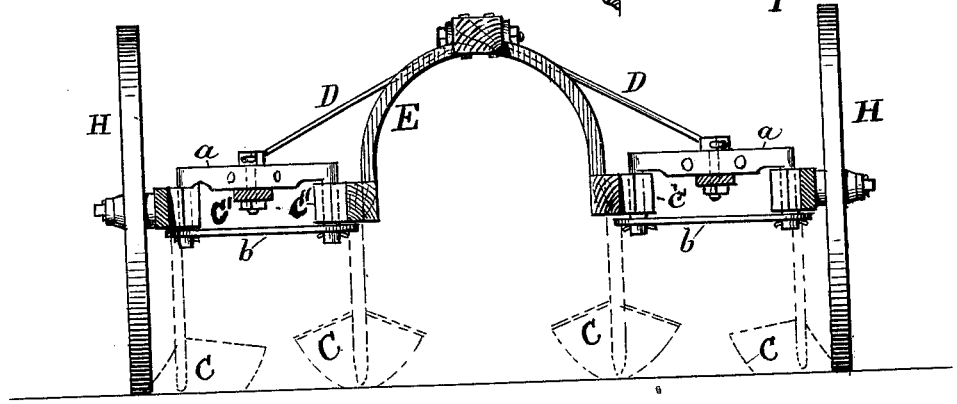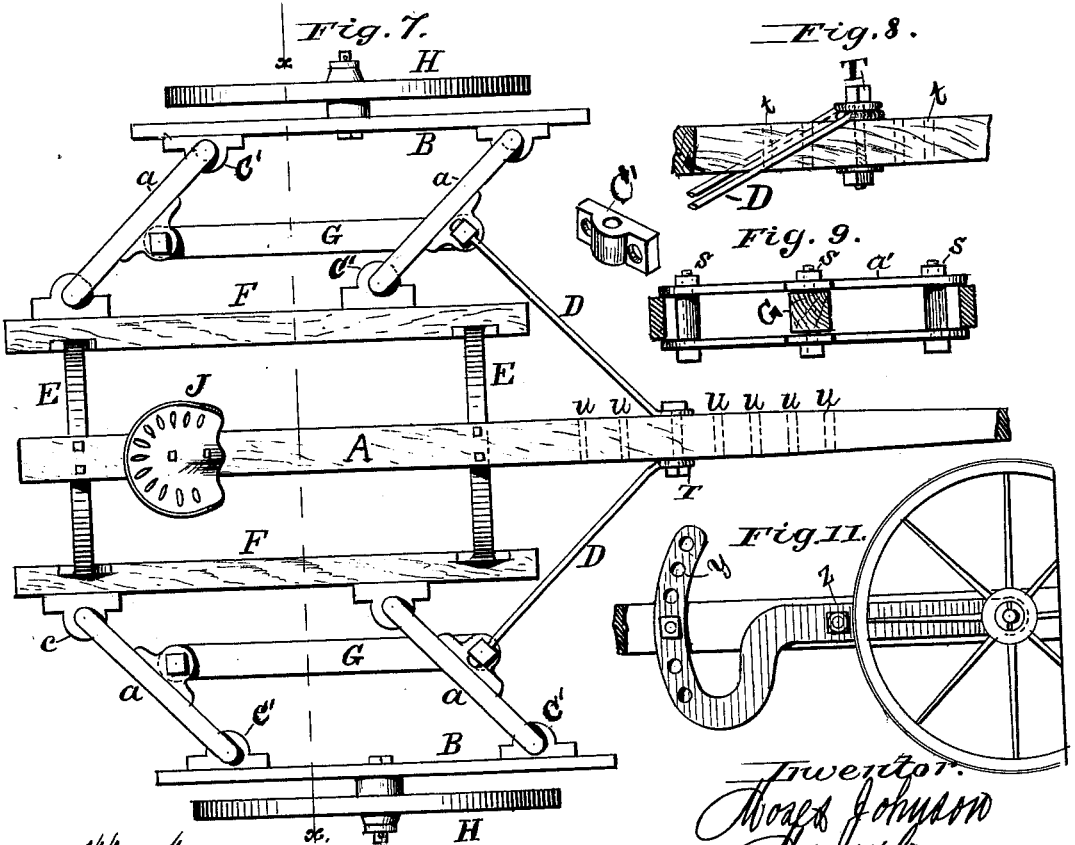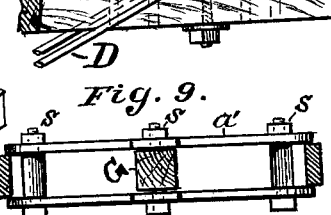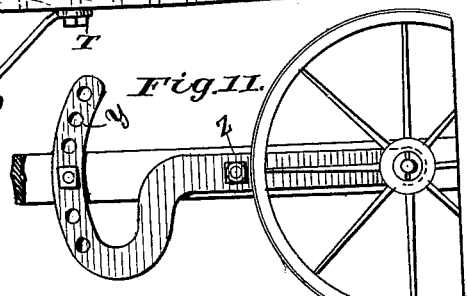

UNITED STATES PATENT OFFICE.

MOSES JOHNSON, OF LOCKPORT, NEW YORK.

IMPROVEMENT IN CULTIVATORS.

Specification forming part of Letters Patent No. 203,048, dated April 30, 1878; application filed January 17, 1878.

*To all whom it may concern:*

Be it known that I, MOSES JOHNSON, of Lockport, in the county of Niagara and State of New York, have invented certain new and useful Improvements in Plows and Cultivators; and I do hereby declare that the following is a full, clear, and exact description of my invention, which will enable others skilled in the art to which it appertains to make and use the same, reference being had to the accompanying drawings, and to letters of reference marked thereon, which form a part of this specification.

My invention relates to that class of agricultural implements commonly known as "cultivators;" and consists in certain improvements in the construction of the same, as hereinafter shown and described.

In the accompanying drawings, forming a part of the specification herein, Figure 1 is a side view of my improved cultivator as constructed when guided by means of handles. Fig. 2 is a plan view of the same. Fig. 3 shows, in plan, the wings of the cultivator constructed for animal draft. Fig. 4 is a detached view of the hinge or method of connecting the wings of the cultivator with main beam. Fig. 5 represents one of the teeth or shovels detached. Fig. 6 shows, in cross-section, and Fig. 7 in plan, a modification of my improvements in a construction of the cultivator for animal draft. Fig. 8 illustrates a modification of my method of connecting the adjustable braces with the beam. Fig. 9 shows a modification of the hinge and connecting-bars. Fig. 10 is a plan view of the connecting-bars shown in Fig. 9. Fig. 11 is a plan view of my lever for elevating or lowering the frame.

In my construction the cultivator is provided with wings that can be extended or contracted from or toward the main beam or body of the cultivator. To these wings the standards of the plows or teeth are fastened, and the parts are so constructed and connected that the outer wings, whether fully extended or contracted, remain securely in positions parallel with the main beam. The means employed for regulating the expansion of the wings is the use of braces connecting with the beam, which are adjustable, as hereinafter described.

The teeth or shovels are made of a single piece of oblong metal, J', bolted diagonally to the standards, so as to make a wide track or furrow. This oblong strip of sheet metal is bent diagonally, as shown at J'', Fig. 5, to an angle, to form a cultivator-tooth at one end thereof, with its other end projecting obliquely from the standard to a distance equal to about twice or thrice the width of the widest part of the heel of an ordinary plow-point, and it is then secured to the standard in any wellknown manner; but, when preferable, the teeth may be cast solid, and bolted or riveted to the standard.

A designates the plow-beam, and B the longitudinal pieces forming the side wings, to each of which is fastened one or more of the plowstandards C. These wings B are preferably connected to the beam A by means of bent bars $a$, the lower or projecting ends of which project through sockets C', secured to wings B, and are connected together by plates $b\ b$, fitting loosely thereon to allow an easy spreading and contracting movement of the wings.

D indicates the braces for regulating the expansion of the wings. These braces are each linked or connected at one end to one of the side wings, and the other end is formed to hook on the pins $g$, as shown in Fig. 1. These pins may be rigidly attached to the metallic plate $y$, or they may be formed as inverted bolts projected through the plate $y$ into recesses provided in beam A, the plate being rigidly secured to the beam. A modification of this feature of my device is shown in Figs. 7 and 8, where the ends of the braces D are formed to hook on the bolts T, which latter may be secured in any of the perforations in the beam designated by the letters $u$, Fig. 7, where the apertures are horizontal, or $t$, Fig. 8, where they are vertical. Two bolts are required to secure the wings when they are spread unequal distances apart; but otherwise one bolt is sufficient.

It is obvious that by this method is attained an easy spreading or contracting of the wings. One wing by this means can be extended or contracted to a greater or less extent than the other, as is sometimes desirable, and thus, by turning one wing to the front and one rearward, the device may be adjusted to form a gang-plow, (and in practice the furrow will thus be turned all one way;) or it may be adjusted to suit the variable stages in the growth of cotton; or the side wings may be easily removed and the device employed as a shovel-plow.

In Figs. 6 and 7 a modification of my invention is shown, the cultivator being constructed for animal draft as what is known as a "two-horse cultivator," and provided with wings connecting with side bars F, the middle part being provided with one or more arches, E, and it is especially adapted to the cultivation of corn. Each wing is provided with a longitudinal bar, G, hinged at each end to one of the bars $a$, and instead of using the side bars F the wings may be connected with the outer extremities of the arches E. The wheels may be suitably secured to the wings, as shown in Fig. 6.

The draft-beam A is provided with seat J for the driver, as shown in Fig. 7.

In Figs. 9 and 10 the construction of the connecting-bars $a'$ is shown, the connection being effected by means of bolts and nuts $s$, which bolts project through the orifices of sockets C', as shown.

Fig. 11 represents a lever for raising and lowering the frame as a means of adjusting the cultivator-teeth deep or shallow, and for elevating them out of the ground when going to and from the field. It is secured by a bolt, about midway of the length thereof, to the side of the side wing, as shown at $z$, one end thereof being curved and perforated to provide means for raising and lowering the wheel. It is secured in position by means of a pin.

I claim—

1. The beam A, bent connecting-bars $a\ a$, constructed to turn in sockets C', and the plates $b\ b$, in combination with the wings B B, adjustable by braces D, and pins $g$, substantially as shown, and for the purpose described.

2. The adjustable braces D, secured by pins $g$, in connection with plate $y$, to beam A, in combination with the connecting bent bars $a\ a$, constructed to turn in sockets C', the plates $b\ b$, and wings B B, substantially as shown and specified.

In testimony that I claim the foregoing as my own I affix my signature in presence of two witnesses.

MOSES JOHNSON.

Witnesses:
JOSEPH ARNOLD,
J. J. ARNOLD.